1,465,183

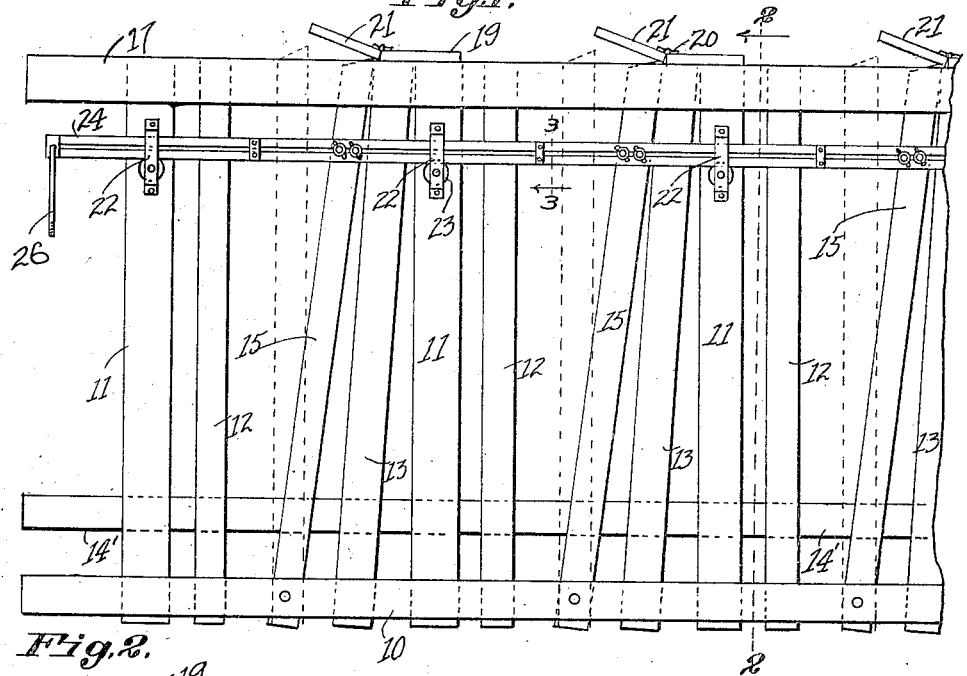
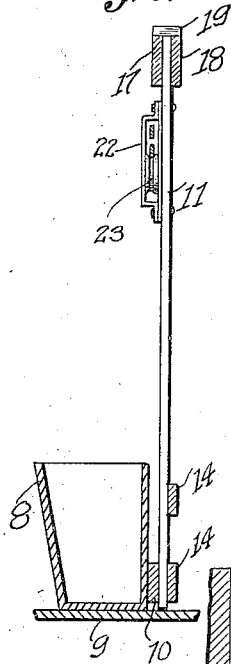
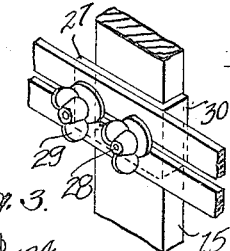
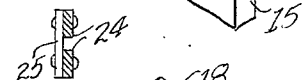
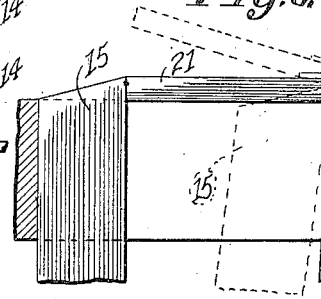
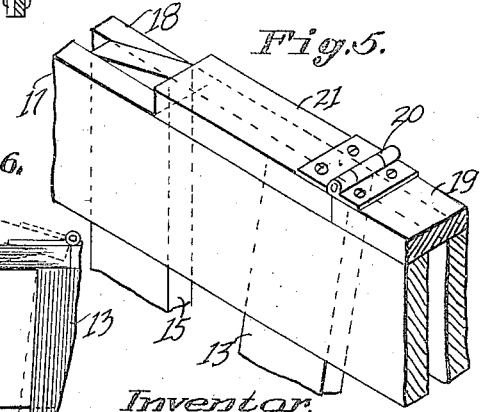
Aug. 14, 1923.
J. SCALETTI
STANCHION
Filed Jan. 6, 1922
1,465,183
Inventor.
Joseph Scaletti Patented Aug. 14, 1923.

UNITED STATES PATENT OFFICE.

JOSEPH SCALETTI, OF SUISUN CITY, CALIFORNIA.

STANCHION.

Application filed January 6, 1922. Serial No. 527,401.

*To all whom it may concern:*

Be it known that I, JOSEPH SCALETTI, a citizen of the United States, residing at Suisun City, in the county of Solano and State of California, have invented new and useful Improvements in Stanchions, of which the following is a specification.

This invention relates to a closure device and has particular reference to an apparatus for readily retaining in position cows, pigs or other stock during the act of feeding.

The principal object of this invention is to provide an apparatus of the character described which is provided with means for releasing or retaining in position one or more animals during the act of feeding or after they have completed their meal.

Great annoyance has been experienced in feeding cattle because of the inability to drive all of the cattle at one time into a position where they can have ready access to the feed hoppers or the manger. After several of the animals to be fed have been maneuvered into a feeding position, it often occurs that a laggard animal will cause confusion in the ranks of the animals to be fed and will also often cause the release of many of the animals because of inefficient or ineffective means for retaining all the animals at one time in a fixed feeding position. To overcome this annoyance and inconvenience I have devised the apparatus hereinafter to be fully described, whereby all the animals can be retained in a fixed feeding position and one or more can be released at the will of the operator.

A further object of this invention is to provide an apparatus of the character described, which is simple in construction, economical to manufacture and highly efficient in use, and which can be applied to a manger without materially altering the construction of the same.

Other objects and advantages will be apparent during the course of the following description.

In the accompanying drawings forming a part of this specification, and in which like numerals are employed to designate like parts throughout the same, Fig. 1 is a side elevation of the animal retaining means, Fig. 2 is a vertical section through the frame, taken on the line 2—2 of Fig. 1, Fig. 3 is a detail view taken on the line 3—3 in Fig. 1 showing a cross strip for connecting the sections of the operating bar, Fig. 4 is a fragmentary detail of one of the locking bars and means for actuating the same, Fig. 5 is a similar view of means for limiting the lateral movement of one of the locking bars, and Fig. 6 is a sectional view of the same, and its associated parts.

In the accompanying drawings wherein for the purpose of illustration is shown a preferred embodiment of my invention, the numeral 8 designates a feed hopper or manger which is positioned on the floor of a conventional pen or barn, the hopper being provided with a horizontal bar 10 having connected thereto a frame or closure which includes spaced vertical bars 11, auxiliary bars 12 and inclined bars 13. Rear horizontally disposed upper and lower bars 14 and 14' also serve to strengthen the above mentioned bars and retain the same in a fixed position.

The numeral 15 designates locking bars which are pivoted to the horizontal bar 10. These bars 15 are positioned between each of the auxiliary bars 12 and the inclined bars 13, so that each locking bar can be made to readily contact with the neck of an animal as it protrudes through the frame and feeds from the hopper 8. The means for actuating the locking bars will be hereinafter fully described.

As shown to advantage in Figures 1 and 6, horizontal beams 17 and 18 are disposed respectively in the front and rear of the said bars. These beams extend the entire width of the frame and are fastened to the bars 11, 12 and 13 adjacent their upper extremities. This construction serves to make the frame rigid and compact.

Mounted on the top faces of the respective horizontal beams adjacent where the bars 11 and 13 are connected thereto, are top blocks 19 each of which has hinged thereto as indicated by the numeral 20, a latch block 21. As disclosed to advantage in Figures 6 and 7 it will be apparent that when each latch block is positioned flush with the top of the beams 17 and 18, then each pivoted bar 15 will be retained in a normally vertical position by virtue of its contact with the latch block, and when the latch block 21 is manually lifted that each pivoted bar 15 will be inclined and assume the full line position illustrated in Figure 1 and the dotted line position illustrated to advantage in Figure 7. Thus each animal can be readily released from the closure frame at the will of the operator.

Connected to the vertical bars 11 are brackets 22 which support therein pulleys or shives 23 over which a horizontally disposed sectional operating bar or rod 24 travels. The sections of the bar are joined by clips 25 and the bar then moves as a unit, when its operating handle 26, disposed on the end of the bar, is actuated. It is to be noted that operating handles can be very readily placed at predetermined points throughout the length of the bar for convenience in actuating the same.

The numeral 27 designates L shaped members which have their body portions extending in parallelism to the operating bar 24 and are detachably secured thereto by bolts 28 and winged nuts 29, with the bolts positioned between the sections of the bar and the nuts mounted on the bolts, which construction permits a tightening or loosening of the member 27 with relation to the locking bars 15. From this construction, it will be evident that upon the actuation of the operating bar in one direction, that the right angular extensions 30 of the body portions of the L shaped members will engage the side faces of the pivoted bars 15 and move them as a unit in one direction for thus retaining the stock in a feeding position. The latch blocks 21 will then fall and assume the full line position as shown to advantage in Figure 7 and will prevent the escape of the stock or cattle. Should all of the animals now be in a feeding position, with the exception of one laggard animal or should it be desired to release any particular animal from a feeding position, then it is only necessary to return the operating rod to its normal position and manually lift the desired latch block 21, and thus a predetermined animal can be freed without disturbing the remainder. If it is desired to secure a laggard animal that has been maneuvered into position in the stanchion without disturbing the remainder, it is then only necessary to lift the latch block 21 in the stall where the animal is, push the operating bar 24 first to the right and then to the left. The movement of the bar 24 to the right has no effect unless the blocks 21 are unlocked or in raised position.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described the combination with a supporting frame, said frame including a plurality of horizontally disposed bars connected to a plurality of spaced vertical and inclined bars, locking bars pivoted to one of said horizontal bars, a sectional operating rod supported by said vertical bars and adapted to move freely and horizontally thereof, adjustable L shaped members connected to said operating rod for contacting with said pivoted bars for moving the same laterally in one direction only and into a locking position, and means secured to the top of said frame for temporarily locking said pivoted bars against movement in the opposite direction, substantially as and for the purpose described.

In testimony whereof I affix my signature.

JOSEPH SCALETTI.